T. A. EDISON.
APPARATUS FOR BURNING PORTLAND CEMENT.
APPLICATION FILED OCT. 24, 1906.
930,946.
Patented Aug. 10, 1909.
3 SHEETS—SHEET 1.
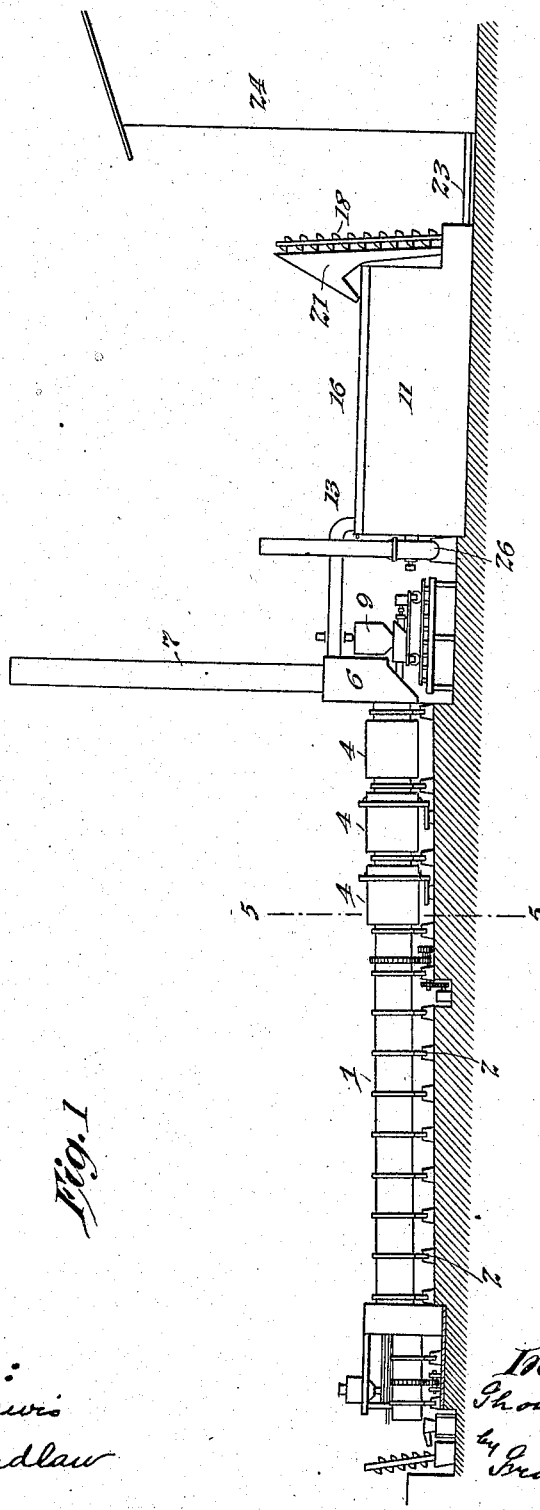

T. A. EDISON.
APPARATUS FOR BURNING PORTLAND CEMENT.
APPLICATION FILED OCT. 24, 1906.
930,946.
Patented Aug. 10, 1909.
3 SHEETS—SHEET 2.
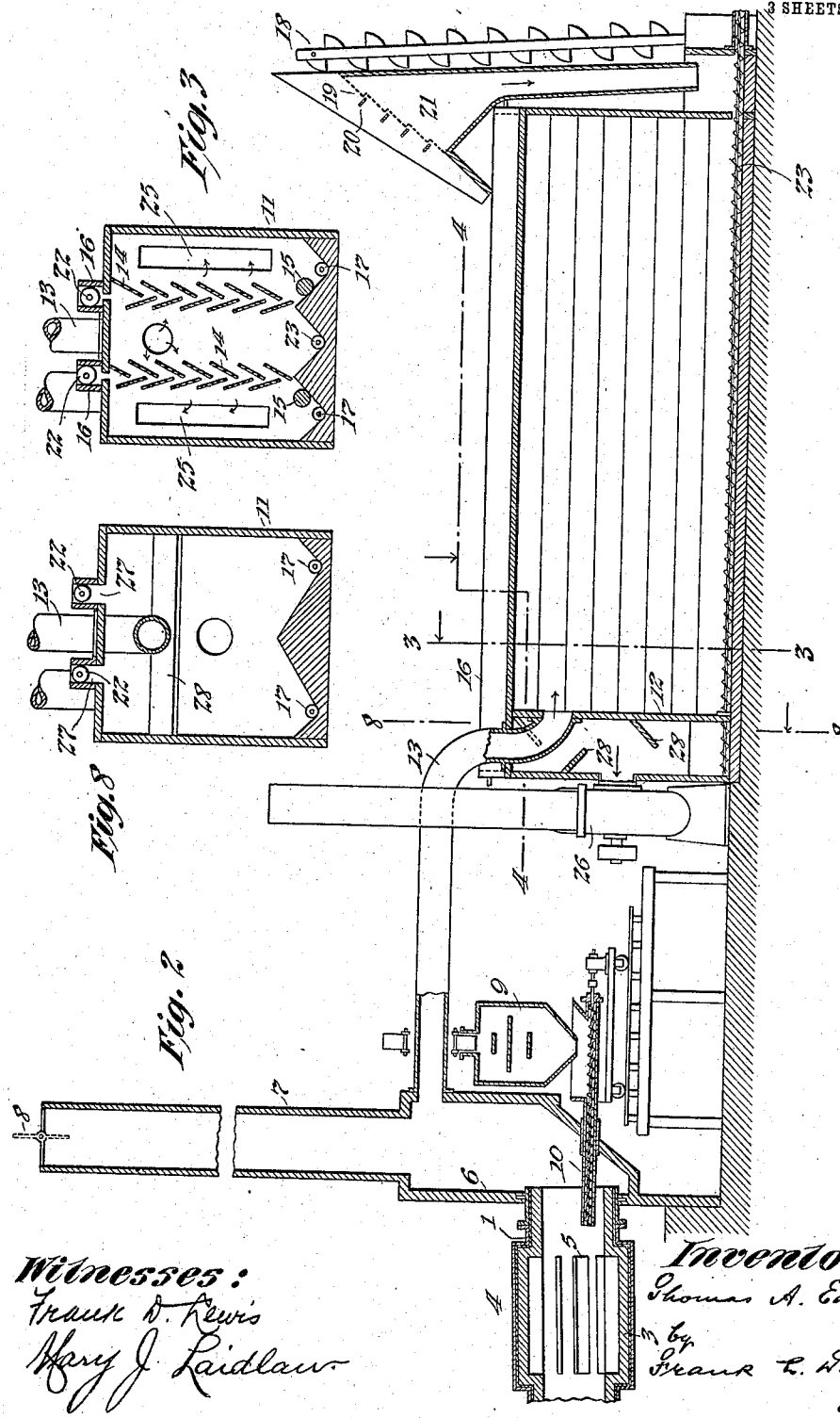

T. A. EDISON.
APPARATUS FOR BURNING PORTLAND CEMENT.
APPLICATION FILED OCT. 24, 1906.
930,946.
Patented Aug. 10, 1909.
3 SHEETS—SHEET 3.
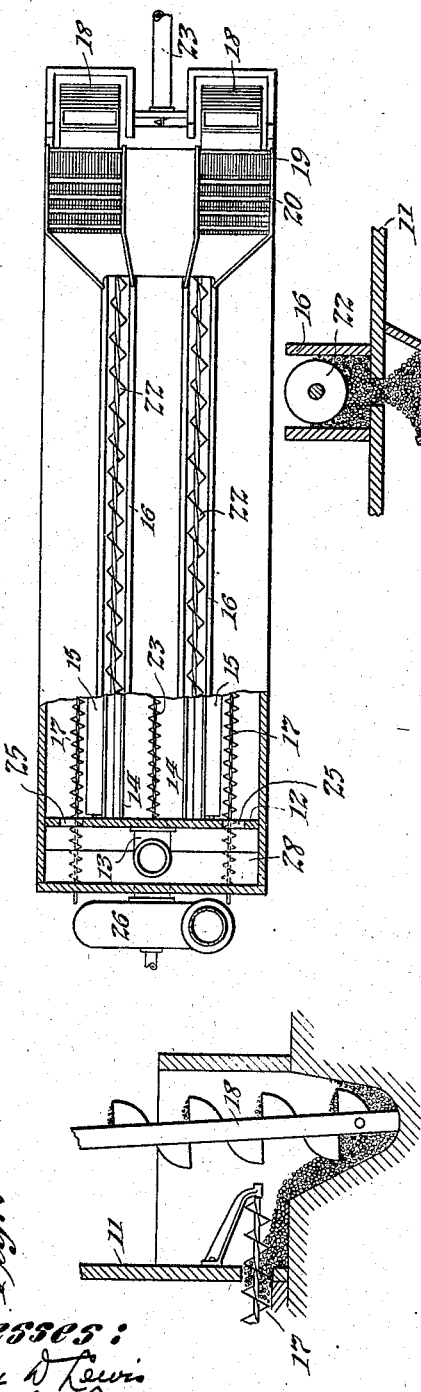

UNITED STATES PATENT OFFICE.

THOMAS A. EDISON, OF LLEWELLYN PARK, ORANGE, NEW JERSEY.

APPARATUS FOR BURNING PORTLAND CEMENT.

No. 930,946.　　　　　Specification of Letters Patent.　　　Patented Aug. 10, 1909.

Application filed October 24, 1906. Serial No. 340,299.

*To all whom it may concern:*

Be it known that I, THOMAS ALVA EDISON, a citizen of the United States, residing at Llewellyn Park, Orange, county of Essex, and State of New Jersey, have invented certain new and useful Improvements in Apparatus for Burning Portland Cement, of which the following is a description.

In my Patent No. 802,631, dated October 24th, 1905, I describe and claim an improved rotary kiln for burning Portland cement and which I have used in practice with excellent results, both as to quality of product and general efficiency. The said kiln consists essentially of a very long cast iron cylinder, lined with firebrick, the length being about 150 feet and the internal diameter from 5 to 5½ feet, one or more streams of pulverized fuel being injected into the cylinder near its lower end, and the products of combustion escaping through a stack at the upper end.

The conditions of operation in a rotary cement kiln are greatly opposed to efficiency of fuel, for the reason that the body of material undergoing treatment occupies only a small portion of the area of the kiln, so that enormous losses are incurred in the exit gases, which leave the kiln at a high temperature. Other losses are incurred by reason of the ineffective heating of the material since practically only a small proportion of the surface of the load of material is subjected to the heat notwithstanding the turning movement given by projection from the lining, as has been proposed. Additional losses are also due to dissipation of heat by conduction and radiation through and from the kiln walls. Furthermore, the flame derived from the combustion of pulverized coal is, for its greater part, non-luminous and hence practically non-radiant, so that in passing practically unconfined through the tubular flue which the kiln presents, very poor conditions are offered for imparting heat to the material except in the lowermost part of the kiln, where the flame is luminous and hence can impart its heat to the material by radiation.

The ineffective character of a rotary cement kiln is made clear by comparing the same with a blast furnace in the lower end of which the temperature is higher than in a cement kiln, yet in the blast furnace the gases leave the upper end at a temperature as low as 400 degrees Fahr. The reason for this high efficiency in a blast furnace is that the products of combustion in their entire transit through the furnace are maintained in contact with the material passing downward through the same, so that the material will be heated by direct impingement, and, consequently, practically all of the heat will be conserved. On the other hand, in a modern rotary cement kiln, the material occupies but a very small part of the heating chamber, so that to raise the material to the high temperature necessary involves the burning of relatively enormous quantities of coal, the bulk of whose heat value is practically wasted. In my said patent, I point out that by making the kiln about 150 feet in length, without materially increasing the diameter, so that the ratio of length to internal diameter is about 30 to 1, instead of about 12 to 1, as was the practice before my invention and is still very extensively the practice in this country, and by largely increasing the load of material in transit through the kiln, it becomes possible to effect material economies in the cost of fuel, since considerable heat from the combustion gases will be absorbed by contact with the large load of material in transit toward the clinkering zone, and substantially all of the carbon dioxid will be evolved before the combustion zone is reached, so that the fuel will be burned to the best advantage. From my own observation in the art, I believe that the kiln which I describe and claim in said patent marks the highest efficiency that can be obtained in apparatus of this general type, so that if greater efficiency is to be secured, it must be either in a radically different apparatus, or by the addition of other features of construction. Apparently, the high cost of labor and the low cost of fuel in this country must, for a long time, limit the cement manufacturer to apparatus of the rotary type, and with this fact in mind I have endeavored to effect further economies in such apparatus by the use of additional devices, by which a substantially new mode of operation is performed.

Briefly stated, what I propose to do is to shower the dry unburned material or chalk diametrically across the kiln as the material progresses slowly toward the lower end, so that the very hot products of combustion passing through the kiln will encounter the incoming material in the most effective manner, to thereby heat the same and drive off water and carbonic dioxid, whereby the products of combustion may be caused to give up substantially all of their heat. In other words, I propose to realize in a cement kiln an approximation to the conditions presented in a blast furnace, the material being so disposed with respect to the products of combustion as to be heated by direct impingement, making the flame luminous and permitting absorption of heat therefrom by radiation and direct contact.

While it would probably not be feasible in a substantially horizontal kiln to realize the ideal conditions presented by a vertical blast furnace in which the entire bulk of the material is directly acted on at all times by the products of combustion, yet, it is possible by equipping the kiln with effective showering devices, to maintain more than 50 per cent. of the material in the path of the products of combustion so as to be heated by direct impingement. I propose in fact to maintain at all times within the kiln a cloud or shower of material occupying the entire bore thereof for a considerable length (say for 50 feet, commencing say ten feet from the upper end, in a kiln 150 feet long) so that there will be no portion of the bore through which the products of combustion may pass, where such products will not be in direct contact with the pulverized material. In this important respect my present improvements are distinguished from the prior suggestions of providing the kiln with ribs or projections which at best merely give the material a turning movement and carry scarcely any of the material much beyond the horizontal axis of the kiln. With such prior suggestions, even if the material were carried as far as the vertical axis substantially half of the bore would be unoccupied by the material, so that the products of combustion would be free to pass through the unoccupied space in a non-luminous condition and with the heat losses referred to.

Of course with such a procedure as I suggest, there would be a prohibitively large loss of chalk carried away with the escaping gases, unless provision were made to recover the same, and for this purpose I make use of an improved settling chamber and filter, in which substantially all of the solid matter escaping with the products of combustion will be separated therefrom, so that no loss from this cause will be experienced. Such a settling chamber and filter might be conveniently used with any rotary kiln in which the dry process is employed, because even when the chalk is fed along the bottom of the kiln in the old way, considerable quantities of it are sucked up by the gases and escape through the stack. Having obtained a very perfect settling chamber and filter, adapted for the effective separation of any solid or dust-like matter from the products of combustion, I prefer to use the same in an apparatus in which the chalk is showered instead of turned as explained, through the kiln, since in that way I more effectively heat the material and also abstract more heat from the escaping gases.

A settling chamber and filter suitable for use in combination or connection with a rotary kiln should have as a most important consideration, a fixed and constant porosity, to thereby present an absolutely uniform resistance to the draft passing through it, so as not to disturb the correct operation within the kiln itself, since variations in the draft seriously affect the character and quality of the resulting clinker. Such a settling chamber and filter should also be capable of being effectively cleaned to permit the separated chalk to be recovered and it should also be of such construction as not to be affected by the high temperatures encountered in its use. To this end, the improved settling chamber and filter which I have invented and which I propose to herein claim, in combination with a rotary cement kiln, and particularly in combination with a rotary cement kiln in which the chalk is showered across the draft, comprises a suitable chamber having one or more walls or partitions through which the draft passes, formed of pulverulent or granular material, presenting innumerable minute tortuous channels, through which the products of combustion find their way, and by which the chalk or other solid matter carried therewith, will be separated.

Provision is made for effecting a slow movement either continuous or intermittent, of the granular material constituting the filtering medium, so that the filtering medium is constantly undergoing change, to permit that portion of the chalk deposited within the same to be separated therefrom, as I will hereinafter describe and claim. By thus continuously changing the filtering medium it cannot become clogged by the accumulation of the fine material or chalk therein so that its porosity remains unaltered and consequently its resistance to the draft will be always constant so as to not affect the conditions within the kiln. In addition to the filtering medium, I also provide a settling chamber of sufficient capacity to permit the velocity of the draft to be very greatly reduced, so that the larger bulk of chalk or dust will be separated by gravity. The chalk so separated from the draft may be returned directly to the kiln or passed to a suitable stock house and mixed with fresh material, and from which it may be withdrawn when desired whereby a part of the heat will be thus saved. The filtering medium which I employ is any suitable relatively coarse material, whose particles may range conveniently between $\frac{1}{16}$ and $\frac{1}{3}$ of an inch. such as coarse sand or coarsely pulverized cement rock. This material is caused to assume the form of a substantially vertical screen or partition, through which the draft passes as explained, and which is kept in constant, though very slow movement, material being added at the top as material is drawn off at the bottom, carrying the separated dust or chalk with it. The filtering material thus drawn off is passed to a screening device by which the fine chalk is separated and returned to the stock house, or elsewhere, while the coarse material is again returned for use in the filtering apparatus. Thus, a substantially constant load of coarse filtering material is maintained in transit from the bottom of the filter through the screening device, and thence to the upper end of the filter, all as I will fully hereinafter describe and claim.

The objects of my invention are the following: First: to provide and produce an improved screening device of constant porosity, adapted particularly for use in combination with a cement kiln, but capable of use in other connections, and by which a uniform resistance will at all times be imposed to the passage of a draft through it, thereby effecting the separation of any solid dust-like particles carried by the draft, the filtering medium being continuously or intermittently replenished without affecting the passage of the draft through the same, thereby permitting the separated dust-like material to be recovered. Second: to provide and produce an improved rotary cement kiln in combination with a filtering device, preferably of the type indicated, and by which any chalk carried out of the kiln with the draft will be recovered, so as to prevent loss from that source. Third: to provide an improved rotary cement apparatus in which I am enabled to shower the chalk crosswise through the draft in the kiln in contradistinction to a mere turning movement, to most effectively heat the chalk and to abstract heat from the products of combustion, and at the same time to prevent loss of material carred out of the kiln with the draft. Fourth: To provide certain other features of construction and operation, all as I will more fully hereinafter describe and claim.

In order that the invention may be better understood attention is directed to the accompanying drawing, forming part of this specification, and in which—

Figure 1, is a side elevation of a combined rotary cement kiln and filter, the kiln being suitably modified to effect the showering of the fine material or chalk crosswise through the kiln as it progresses longitudinally along the same. Fig. 2, a longitudinal sectional view on an enlarged scale, showing the upper end of the kiln and the filter. Fig. 3, a cross sectional view on the line 3—3 of Fig. 2. Fig. 4, a plan and sectional view on the line 4—4 of Fig. 2. Fig. 5, a section on the line 5—5 of Fig. 1. Fig. 6, an enlarged detail sectional view, showing a part of one of the filter walls. Fig. 7, an end view showing a detail of the lower end of one of the elevators and conveyers leading into the same, and Fig. 8, a section on the line 8—8 of Fig. 2.

In all of the above views, corresponding parts are represented by the same numerals of reference.

The kiln 1 as heretofore, is made of cast iron sections, its total length being preferably in the neighborhood of 150 feet, and its internal diameter about 5 or 5½ feet. The kiln is supported on rollers 2, and is maintained at a slight angle so as to cause the fine material or chalk to progress slowly along the same as the kiln is rotated. The firebrick lining 3, is of the usual construction, and protects the cast-iron walls from the heat. The upper portion of the kiln, say, for a length of about 50 feet, is formed of sections 4—4, somewhat larger in diameter than the main portion of the kiln, and within these enlarged portions I provide inclined wings 5 (see Fig. 5) arranged to form pockets for carrying up the material and showering it diametrically across the kiln, as will be understood, whereby the material will be constantly falling off of the wings, until the wings have passed considerably beyond the vertical line of the kiln, as shown in said figure, so as to maintain a cloud or shower of the fine dust filling substantially the entire bore of the kiln. In this way no unoccupied space is offered through which the products of combustion may pass in a non-luminous condition, but the products of combustion will be of necessity brought into direct contact with the fine material. These wings are made preferably of firebrick and their inner edges extend substantially in line with the bore of the main portion of the kiln, so that in each of the outer sections 4, additional space is provided in which a considerable load of material may accumulate to more effectively abstract heat from the products of combustion. By providing additional spaces in this way within the kiln it is possible to increase the load of chalk which may be showered by the wings 5, so that 50 per cent. or more of the load may be maintained at all times in the direct path of the products of combustion and filling substantially the entire bore of the kiln. In this way the flame is made luminous so that the heat therefrom will be absorbed by radiation as well as direct contact. The kiln is fired in any suitable way, preferably by one or more streams of pulverized fuel injected into the kiln at the lower end, as is now the practice. The upper end of the kiln opens into a chamber 6, from which extends a stack 7, having a damper 8 therein, so that if desired, the products of combustion may pass up through the stack. The stack may also be used when the kiln is first fired or in case of accident to the filtering apparatus. The pulverulent material or chalk is supplied to a bin 9, and is fed therefrom into the upper end of the kiln by a screw conveyer 10, as heretofore.

Adjacent to the upper end of the kiln is the settling chamber or filter 11, comprising generally a rectangular structure, whose walls may be conveniently built of firebrick or cement. Near the front of the filter is the wall 12, through which passes a flue 13, connecting with the chamber 6, whereby the products of combustion, etc. from the kiln will be directed into the central part of the filter. Extending longitudinally of the filter between the wall 12 and the rear wall are two vertical rows of plates 14, inclined at a very acute angle (see Fig. 6) and made preferably of firebrick or cement. I supply to the two sets of plates a load of relatively coarse material, constituting a screening or filtering medium, and which may be composed of coarse sand or gravel or coarsely ground cement rock, the particles ranging preferably between 1/16 and 1/8 of an inch in size, the thickness of the body of coarse material being about one and one-half inches. The filtering material will accumulate between the inclined shelves, so as to form a substantially vertical filter presenting innumerable fine interstices and tortuous channels, through which the draft may pass and in which any fine dust or chalk may settle. The filtering material in each filtering partition is kept very slowly in movement by means of a roller feed 15, operated in any suitable way, fresh material being supplied from an extended trough 16, above each filter. The coarse granular filtering material drawn off at the bottom of each partition and carrying with it the load of separated chalk or dust is deposited by the roller feed 15, onto a conveyer 17 of any suitable type, and by which it is conducted to an elevator 18 (see Fig. 7) and is elevated by the latter and deposited upon a series of screens 19, provided with checking shelves 20, so as to prevent the material from passing too rapidly over the screens. By means of the screens 19, the fine dust or chalk will fall into a chute 21, while the coarse materials will be returned to the hoppers 16 and be distributed through the latter by conveyers 22. The presence of the coarse material intermixed with fine dust or chalk will very materially facilitate the effective screening of the latter. From the chute 21, the fine chalk is deposited in the path of the conveyer 23, which leads to a suitable stock house 24. The conveyer 23, extends longitudinally of the main portion of the filter between the two filtering partitions. This portion of the filter is formed with an inclined bottom, as shown, and constitutes a settling chamber which is of such a size relatively to the area of the kiln that the velocity of the products of combustion is materially arrested, so that the greater proportion of dust or chalk carried therewith will deposit by gravity in the settling chamber and be carried off by the conveyer 23 into the stock house. The draft, after passing through the filtering walls, escapes through two vertical openings 25 in the wall 12, and is sucked out from the front of the filter by a fan 26, operated from any source of power, preferably an electric motor controlled by the kiln man at the front of the kiln.

By creating the draft within the kiln through the agency of a fan operated by a readily controllable motor, the draft is under much better control than when created by the stack, as is now the practice, and it may be quickly varied by the kiln man to meet any changing conditions within the kiln. It will be obvious that this suggestion of utilizing an artificially created controllable draft within the kiln, can be effectively employed in kilns of ordinary construction, as well as with kilns of the type disclosed in my patent, and that the expedient is not necessarily limited to an apparatus of the special type disclosed herein.

The hoppers 16 extend, as shown, beyond the partition 12, and are formed with openings 27 therein, so that any surplus of coarse material fed longitudinally of the hoppers by the conveyers 22 will be deposited in the path of the conveyers 17, and thence kept in transit over the screens 19, and back to the hoppers. In this way, I insure a constant supply of material to the filtering walls, so that a uniform load of coarse material will be always in position on the inclined shelves 14. This is of the utmost importance when the device is used in connection with a rotary kiln, because I am thereby enabled to keep the porosity and resistance of the filtering device absolutely uniform, so as not to result in disturbance in the operation of the kiln. Preferably, checking shelves 28 are arranged in the chamber formed between the front walls for the coarse material falling from the openings 27 onto the conveyers 17.

In operation, the fine material or chalk is fed to the kiln in the usual way and in passing slowly through the same will enter the pockets formed by enlarged sections 4 of the kiln, so as to accumulate therein in comparatively large loads. Within these pockets the material will be engaged by the wings 5 and carried upwardly so as to be showered diametrically across the kiln and directly across the draft. By properly proportioning the angle of the wings 5, this showering of the material can be adjusted so as to take place even after the wings have passed the central vertical line of the kiln, whereby the bore of the kiln will be substantially occupied with a cloud of fine particles falling through the same and across the path of the draft. It is not absolutely necessary to employ the enlarged sections, since properly arranged and shaped projections might be carried by the lining of a kiln having substantially a continuous bore, but such enlarged sections are desirable as they permit large loads of the fine material to accumulate therein, and thus allow a much larger mass of material to be presented to the direct effect of the products of combustion. By thus showering the chalk across the kiln, it will be very perfectly acted upon by the products of combustion and nearly all of the heat will be absorbed by the material, so that the operation may be made very economical. Such procedure as this would, however, be prohibitively costly, unless some means were provided to separate the fine chalk which would be carried out of the kiln by the draft; and this separation with my improved apparatus is effected by the settling chamber and filter.

From the kiln the draft carrying with it a relatively large proportion of the fine dust, enters the settling chamber between the two filter walls. The area of this settling chamber is so great that the velocity of the draft will be greatly reduced, so that a large portion of the chalk will be deposited by gravity in the settling chamber and will be carried off into the stock house 24 by the conveyer 23. From the settling chamber the products of combustion pass slowly through the channels presented by the granular filtering material carried by the inclined plates 14, the area presented by the filtering material being very extensive and permitting the products of combustion to seep relatively slowly through the filtering walls. By thus causing the products of combustion to pass slowly through the fine channels or pores presented within the filtering material, any excessively fine dust-like solid particles carried by the draft and which were not deposited in the settling chamber will be effectively separated and retained within the filtering material on account of the slow movement of the gaseous currents in the channels, and also because the channels are so tortuous that the dust particles must in many cases be lifted up against gravity, which the slow movement of the gaseous currents is unable to effect.

Preferably, I maintain the load of coarse particles in constant but very slow movement, so that the filtering body is being constantly replenished, while at the same time its porosity remains unchanged. A movement sufficient to effect a complete change of the filtering wall in one hour will be sufficiently rapid for the purpose. Although the filtering material is thus in constant movement, the resistance offered by the filtering walls remains constant so that the draft within the kiln may be always maintained in the most effective condition without being subjected to objectionable fluctuations.

I am aware that in some of the industrial arts it has been proposed to make use of filters for separating fine dust-like particles from gaseous currents, for example, by equipping a settling chamber with a bottom formed of a series of bags through which the draft escapes leaving a deposit of the fine material within the filter bags. But with such a device, as with all forms of filters with which I am familiar, the porosity of the filtering medium is gradually lessened by the accumulation of the separated material within its pores and consequently, the resistance to the passage of the draft is greatly increased until the draft finally becomes choked. Such an arrangement could not be effectively used in connection with a cement kiln, because it is essential for the correct operation of such a kiln that the conditions of the draft should be kept uniform at all times and controllable.

Having now described my invention, what I claim as new and desire to secure by Letters Patent is as follows:

1. In cement burning apparatus, the combination with a rotary kiln, means for burning material in transit through the same, and means for showering the material diametrically across the kiln and directly in the path of the products of combustion, of a settling chamber connected with the discharge from the kiln, and of large size to permit the velocity of the products of combustion to be very greatly reduced so as to effect a separation by gravity of the solid or dust-like particles therefrom, and a filter adjacent to the settling chamber and through which the products of combustion pass from the settling chamber to effect a final separation of the finer solid or dust-like particles carried in suspension, said filter presenting at all times a constant porosity, substantially as and for the purpose set forth.

2. In cement burning apparatus, the combination with a rotary kiln, and means for burning material in transit through the same, of a settling chamber of large size to reduce the velocity of the products of combustion and effect a separation by gravity of the dust-like particles therefrom, and a filter having at all times a constant porosity and through which chamber and filter the products of combustion pass, and a controllable exhaust fan connected with the filter, whereby a regulable draft may be created within the kiln, substantially as and for the purpose set forth.

3. In cement burning apparatus, the combination with a rotary kiln and means for burning material in transit through the same, of a settling chamber connected with the discharge from the kiln, the opposing walls of said settling chamber being formed of loose granular material and each wall constituting a filter, and means for admitting the discharge gases from the kiln between the said walls substantially as and for the purpose set forth.

4. In cement burning apparatus, the combination with a rotary kiln and means for burning material in transit through the same, means for showering the material diametrically across the kiln and directly in the path of the products of combustion, of a settling chamber connected with the discharge from the kiln the opposing walls of said settling chamber being formed of loose granular material and each wall constituting a filter, the discharge gases from the kiln being admitted between said filtering walls substantially as and for the purpose set forth.

5. In cement burning apparatus, the combination with a rotary kiln and means for showering the pulverized material therein diametrically across the kiln and directly in the path of the products of combustion, of a settling chamber connected with the discharge from the kiln, said chamber provided with surfaces on which dust deposits by gravity, and means for removing the same, and filtering walls, and means for automatically collecting and removing the dust deposited in the same, substantially as described.

This specification signed and witnessed this 22nd day of October 1906.

THOMAS A. EDISON.

Witnesses:
    FRANK L. DYER,
    ANNA R. KLEHM.